Jan. 20, 1931.  A. W. CAPS  1,789,351
PHOTOGRAPHIC COPYING MACHINE
Filed June 26, 1925   3 Sheets-Sheet 1
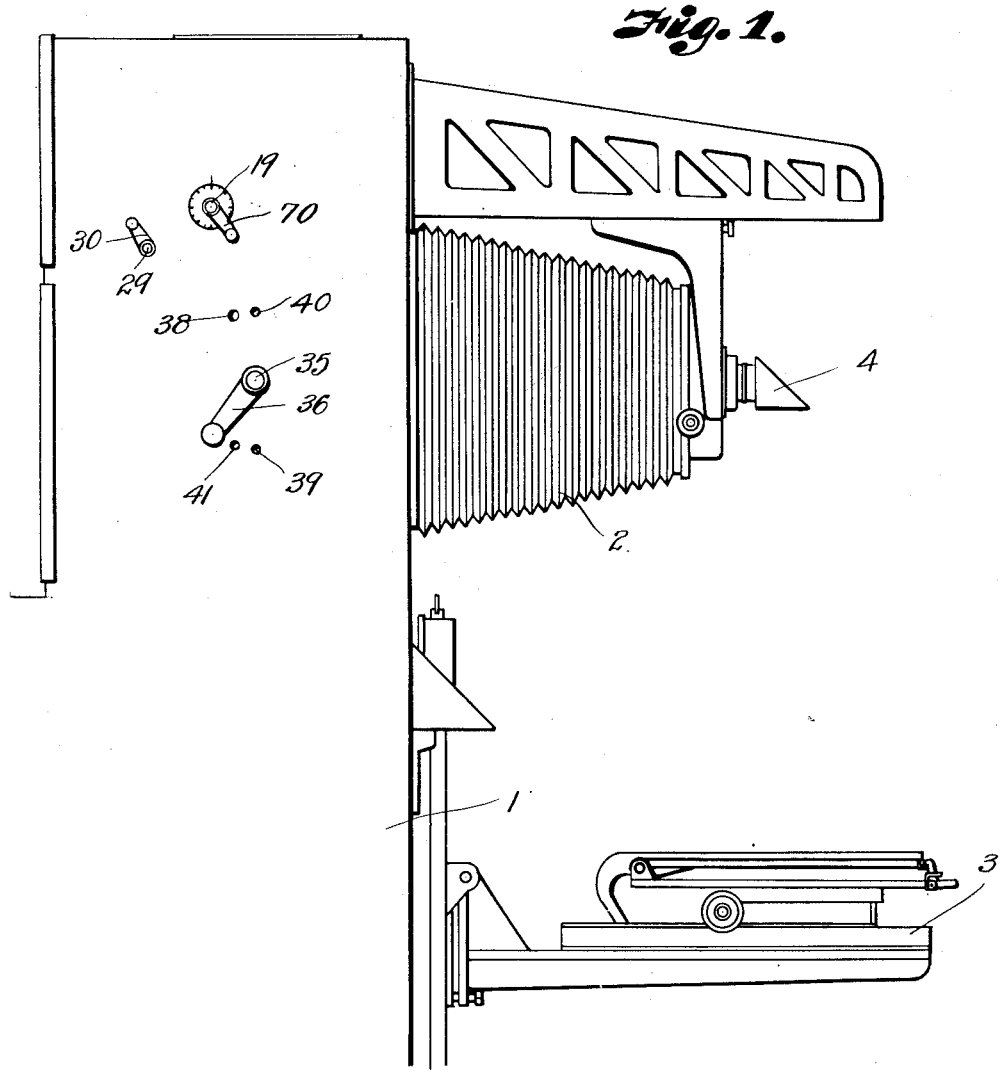
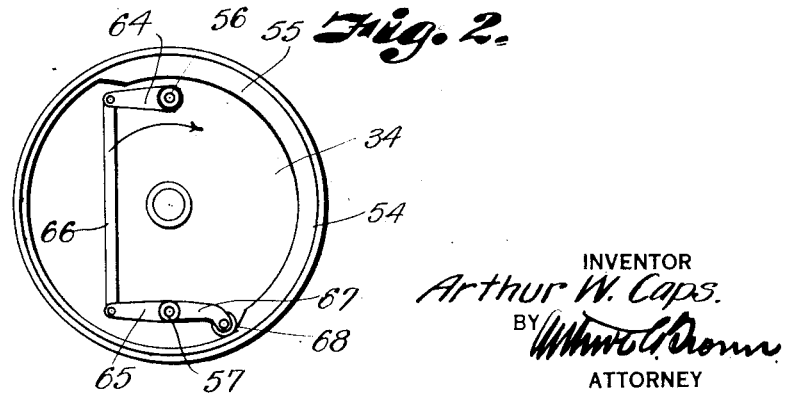
INVENTOR
Arthur W. Caps.
BY
ATTORNEY Jan. 20, 1931.     A. W. CAPS     1,789,351
PHOTOGRAPHIC COPYING MACHINE
Filed June 26, 1925     3 Sheets-Sheet 2
Fig. 3.
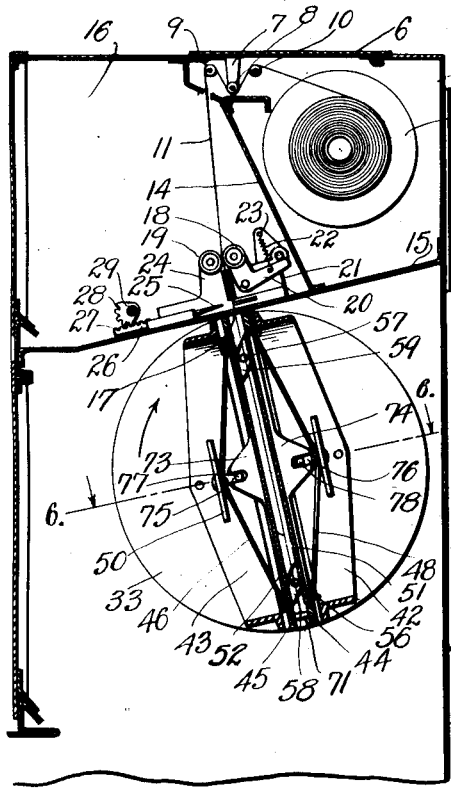
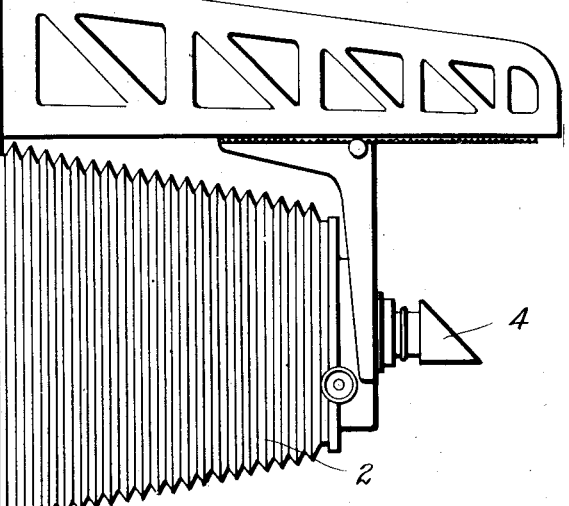
Fig. 5.
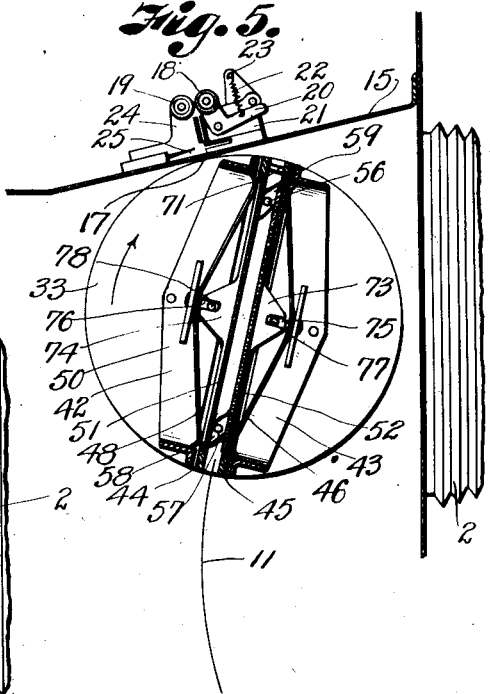
Fig. 4.
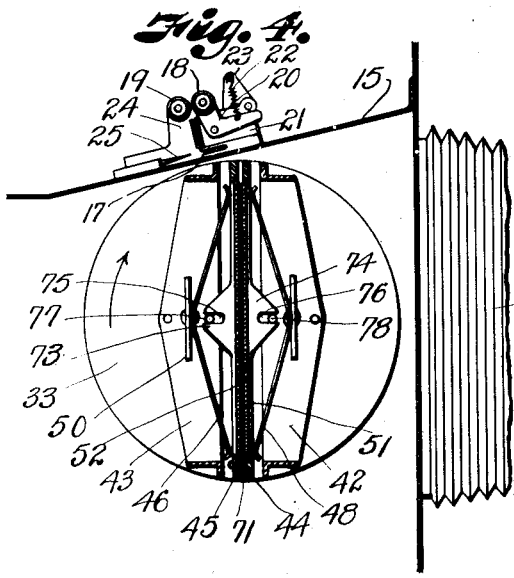
INVENTOR
Arthur W. Caps.
BY
ATTORNEY Jan. 20, 1931. A. W. CAPS 1,789,351
PHOTOGRAPHIC COPYING MACHINE
Filed June 26, 1925  3 Sheets-Sheet 3

INVENTOR
Arthur W. Caps.
BY
ATTORNEY

Patented Jan. 20, 1931

1,789,351

UNITED STATES PATENT OFFICE

ARTHUR W. CAPS, OF KANSAS CITY, MISSOURI, ASSIGNOR TO PHOTOSTAT CORPORATION, OF PROVIDENCE, RHODE ISLAND, A CORPORATION OF RHODE ISLAND

PHOTOGRAPHIC COPYING MACHINE

Application filed June 26, 1925. Serial No. 39,754.

This invention relates to photographic copying machines in which a projecting apparatus is employed for projecting the image to be photographed upon the sensitized sheet, the primary object being to provide novel mechanism for handling the sensitized paper as it passes through the machine.

The invention is illustrated as including a casing in the upper portion of which is a paper roll holder or spool holder carrying a roll or spool of paper which may be fed to a sheet holder, there being a paper-severing mechanism between the roll holder and the sheet holder so that as the paper strip is fed off the roll it may be cut into sheets. The sheet holder is reversible so that it may present opposite sides of the sheet to the projecting apparatus, it being understood that the paper is sensitized on both sides. The sheet holder is shown as including co-operating sensitized-sheet holding frame members adapted to be spread apart to permit the sheets to pass between them and then move to clamping position to clamp the sheet before the exposure is made. The frames are also movable apart to permit the exposed sheet to drop or gravitate to the bottom of the casing, preferably into a receptacle provided to receive them.

The specific construction of the illustrated embodiment of my invention will be described hereinafter, reference being had to the accompanying drawings, in which Fig. 1 is a side elevational view of a photographic copying machine constructed in accordance with my invention.

Fig. 2 is a face view of a cam and mechanism operated by the cam for effecting the opening and closing of the paper sheet clamping frame members.

Fig. 3 is a sectional view through the casing of the machine and through the paper handling mechanism, the projecting apparatus being shown in side elevation, the sheet holder being shown in position to receive the sheet of sensitized paper.

Fig. 4 is a sectional view through the sheet holder showing the clamping members in paper clamping positions and in position to present the sheet to the projecting apparatus for exposure.

Fig. 5 is a sectional view through the sensitized-sheet holder showing the parts in position to permit the exposed sheet to gravitate to the bottom of the casing.

Figure 6:
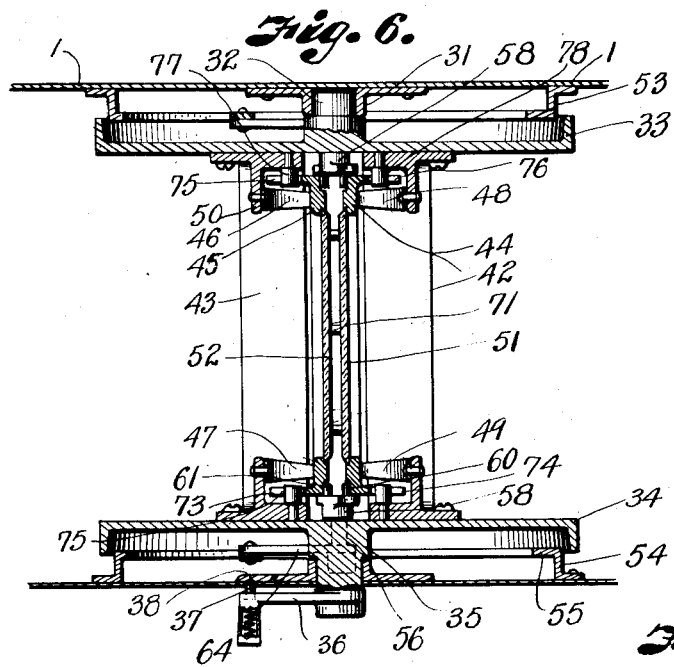
Fig. 6 is a sectional view on the line 6—6 of Fig. 3.
Figure 8:
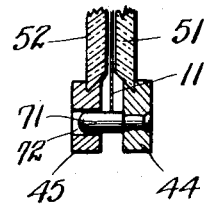
Fig. 8 is a fragmentary sectional view of the paper holding panels showing the stop pins for the sheet.

Referring now to the drawings by numerals of reference, 1 designates a casing having an object projecting apparatus shown as a camera associated therewith, and below the camera is an appropriately designed copy holder 3, the particular construction of which is immaterial, but it should preferably include a reversible copy holding frame so that both sides of the object to be photographed may be exposed to the prism 4 of the projecting apparatus 2. In the upper part of the casing is a paper box 5 having a door 6 carrying brackets 7 in which is mounted a roller 8 complementary to the two rollers 9 and 10 carried by the sides of the casing 1. The rollers are in staggered relation so that the paper strip 11 passing over them will be put under tension. The paper strip is supported in the box 5 in a roll upon the spool 13. The box is formed by the top, front and sides of the casing, a rear partition 14 and a transverse partition 15 which runs entirely across the casing to prevent light from the projecting apparatus entering the box or the space 16 in rear of the box, through which the paper is fed to the sensitized-sheet holder. The partition 15 is provided with a slit or opening 17 through which the paper may feed into the paper holder.

The paper is preferably fed manually, so it passes between two rollers 18 and 19 mounted within the space or compartment 16. The roller 18 is carried by an elbow lever 20 pivoted to the bracket 21. There is a tension spring 22 connected to one arm of the elbow lever and to an anchor 23 so that the one arm of the elbow lever and the roller 18 which it carries will be urged toward the paper strip to force the paper strip against the idler roller 19 on bracket 24. Immediately below the rollers 18 and 19 is a reciprocatory strip-severing knife 25 carried by the bar 26 which has rack teeth 27 in it engaged by the teeth of a segment 28 on shaft 29. The shaft 29 extends through one side of the casing 1 and it is provided with a crank handle 30 so that when the operator swings the handle 30 in one direction the knife will be projected across the plane through which the paper moves as it passes through the slot 16, thereby severing the paper into sheets as the paper is fed into the sheet holder.

The sensitized-sheet holder is best shown in Figures 3, 4, 5, 6, and 7. On the inner face of one side wall is a bearing member 31 receiving a stub shaft 32 on the disk 33. A similar disk 34 on the opposite side of the casing 1 is provided with a stub shaft 35 which projects through the side wall of the casing 1 and carries a crank 36 with a spring-pressed detent 37 adapted to engage recesses 38, 39, 40 and 41 in the outside face of the casing 1 (see Fig. 1). The two disks 33 and 34 are rigidly connected together by two substantially rectangular frame members 42 and 43. The members 42 and 43 are spaced apart and between them are two sensitized-sheet holding frame members 44 and 45 normally urged together by the flat springs 46, 47, 48 and 49. The middle portions of the springs are secured to lugs or brackets 50 on the frame members 42 and 43 and their free ends bear against the frame members 44 and 45 which carry transparent panels 51 and 52 so that the sheet of paper is received between the panels 51 and 52 to be exposed to the projecting apparatus.

Figure 7:
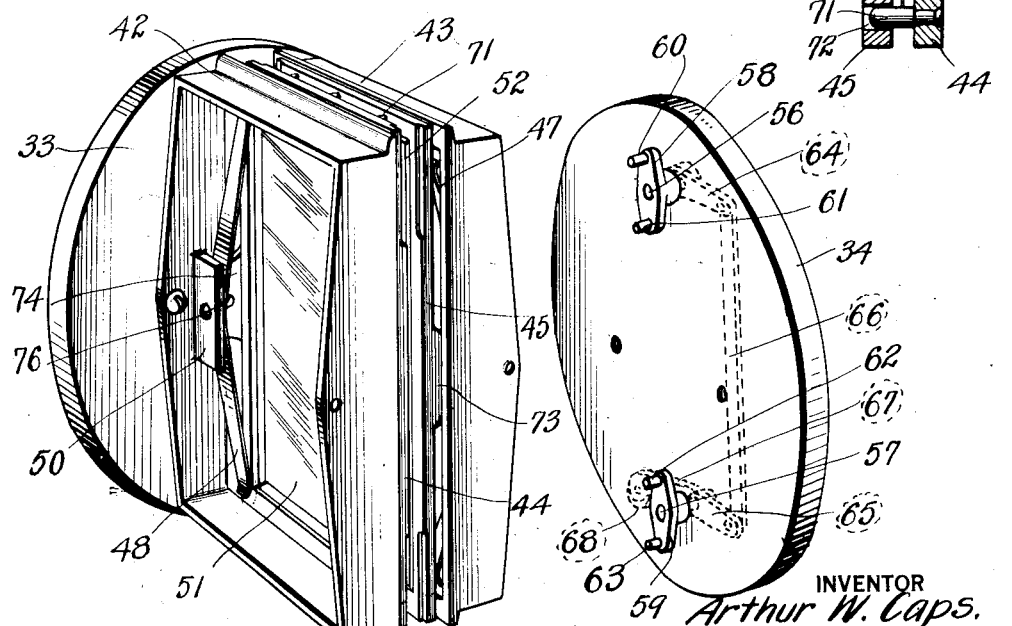
Fig. 7 is a perspective view of the paper holding frame and the spreading mechanism for spreading the paper holding frame members.

On the respective side walls of the casing 1 are two cam rings 53 and 54. One of these rings is shown in Fig. 2 as provided with a cam 55, a like cam being on the other member. The cams co-operate with certain mechanism for spreading the frame members 44 and 45. The spreading mechanism is best shown in Figures 2 and 7. On each disk 33 and 34 are two rock shafts 56 and 57 which carry heads 58 and 59 with outwardly projecting fingers 60 and 61 on head 58, and 62 and 63 on head 59. The opposite ends of the rock shafts 56 and 57 have crank arms 64 and 65 connected by a link 66. The crank arm 65 on each disk extends beyond the shaft 57 and constitutes a roller arm 67 on the end of which is a roller 68 which rides upon the cam 53. The fingers 60, 61, 62 and 63 on the rock shaft of each disk are located between the edges of the frame members 44 and 45, there being fingers at each side of the casing so that rotation of the disks 33 and 34 in a clockwise direction at the proper period of rotation will cause the rollers 68 to ride on the cam 55 to rock the shafts 56 and 57, moving the fingers 60, 61, 62 and 63 away from a vertical plane so as to spread the sensitized-sheet holder frame members 44 and 45 against the actions of the springs 46, 47, 48 and 49.

If the detent lever 37 is in the recess 38 the roller 68 will be on the cam 55 and the frame members 44 and 45 will be spread apart, but the space 69 between the panels 51 and 52 will be in register with the opening 17 in the partition 15. Then as the operator turns the crank 70 on the end of the shaft for roller 19, the paper 11 will be fed into the space between the panels 51 and 52 a sufficient distance to cause the edge of the sheet to contact with pins 71 at which time the sheet will be co-extensive with the panels 51 and 52. At this time the operator may swing the handle 30 to project the knife against the paper strip to sever it so that the sheet portion in the sensitized-paper holder will be separated from the strip. Then the operator will swing the handle 36 to a position to allow the detent 37 to engage the notch 40. This will throw the roller 68 off the cam so that the fingers 60, 61, 62 and 63 will assume substantially vertical positions or neutral positions between the frame members 44 and 45, allowing the springs 46, 47, 48 and 49 to force the frame members 44 and 45 one toward the other to clamp the sheet between them. The holder will then be in the position shown in Fig. 4. When the frame members 44 and 45 are in vertical planes with the paper gripped between the panels 51 and 52 the sheet of paper will lie in a plane perpendicular to the axis of the lens of the projecting apparatus and one side of the paper will be exposed to the projecting apparatus so that the exposure may be made. After the exposure has been made and the shutter of the camera closed, the operator may swing the handle 36 to a position to permit the detent 37 to engage the recess 39. This will rotate the sheet holder and therefore the sheet, through an arc of 180 degrees to expose the other side of the sheet. After the second exposure has been made the operator will swing the handle 36 over to a position to permit the detent 37 to engage the recess 41, causing the roller 68 to again ride upon the cam 55, again rocking the shafts 56 and 57, swinging the heads 58 and 59 through an arc of about 90 degrees to spread the frame members 44 and 45 apart so that they will assume the positions shown in Fig. 5. The sheet which now has been twice exposed will gravitate to the bottom of the casing because it will be released by the spreading of the frame members 44 and 45.

It now becomes necessary to introduce a new sheet or part of a strip sufficient to provide a new sheet, so the operator next swings the handle around to the position to permit the detent 37 to again engage the recess 38, it being understood that the frame members are spread apart the entire time that the roller 68 is on the high lobe 55 of the cam.

The cycle of operations will continue as long as necessary to make the exposure.

The two frame members 44 and 45 may have side wings 73 and 74 with notches 75 and 76 to engage guide pins 77 and 78 so that when the frame members 44 and 45 are spread apart they will be maintained in parallelism.

It will be apparent from the foregoing that the paper may be conveniently and expeditiously handled, and that danger of making two exposures upon one side of the paper will be eliminated.

What I claim and desire to secure by Letters Patent is:—

1. In a photographic copying machine, the combination with a camera body embodying a casing and a lens, of a roll holder for a strip of sensitive material arranged in the casing, a holder rotatably mounted in the casing adapted to support a portion of the strip in the focal plane of the lens, and a severing device for the sheet arranged between the roll holder and the rotatably mounted holder.

2. In a photographic copying machine, the combination with a camera body embodying a casing and a lens, of a roll holder for a sheet of sensitive material arranged in the casing, a holder in the casing adapted to support a portion of the sheet in the focal plane of the lens, said last mentioned holder being reversible to present first one side and then the other of the sheet to the rays from the lens, and a severing device for the sheet arranged between the roll holder and the sheet holder.

3. In a photographic copying machine, the combination with a camera body having a lens, and a roll holder for feeding a strip of sensitized material through the focal plane of the camera including feeding devices therefor, of a reversible holder for receiving the strip and supporting a portion thereof in the focal plane, said holder being rotatable and its axis being transverse to the direction of feed of the film strip, and a cutting device for severing a portion of the strip after it has passed into the holder.

4. In a photographic copying machine, the combination with a camera body having a lens, and a roll holder for feeding a strip of sensitized material through the focal plane of the camera including feeding devices therefor, of a reversible holder for receiving the strip and supporting a portion thereof in the focal plane, said holder being rotatable and its axis being transverse to the direction of feed of the film strip, and a severing device arranged between the roll holder and the second mentioned holder for detaching a portion of the sheet held thereby between the reversing movements of the holder.

5. In a photographic copying machine, the combination with a camera body embodying a casing and a lens, of a reversible rotatable holder for supporting the section of a strip of sensitive material in the focal plane to alternately expose the two sides thereof, a relatively fixed roll holder for feeding a strip of sensitive material to the first mentioned holder, and a severing device, independent of the movements of the latter for intermittently cutting the strip so that a detached portion thereof will be carried by the first mentioned holder during the reversing movements thereof.

6. In a photographic copying machine, the combination with a camera body embodying a lens and a casing, of a roll holder for holding a strip of sensitive material, sheet holding mechanism within a casing adapted to support the sensitized sheet of material in the focal plane of the lens, said mechanism comprising a frame and a pair of panels in the frame normally urged one toward the other, means for feeding a portion of said strip from said roll holder to said sheet holding mechanism, means for severing the sheet material fed to said holding mechanism from the remaining sheet material, means for reversing the frame, and means for spreading the panels during the reversing movement of the frame so that a new section of the strip may be received and the exposed section released.

7. In a photographic copying machine, the combination with a camera body embodying a lens and a casing, a sheet holding mechanism within the casing adapted to support the sensitized sheet of material in the focal plane of the lens, said mechanism comprising a frame, a pair of transparent panels in the frame normally urged one toward the other, means for reversing the frame and means for spreading the panels during the reversing movement of the frame, said means comprising fingers interposed between the panels arranged in pairs and in longitudinal alignment with respect to the space between the panels, and means for moving the fingers out of longitudinal alignment to spread the panels.

8. In a photographic copying machine, the combination with a camera body embodying a lens and a casing, a sheet holding mechanism within the casing adapted to support the sensitized sheet of material in the focal plane of the lens, said mechanism comprising a frame, a pair of transparent panels in the frame normally urged one toward the other, means for reversing the frame and means for spreading the panels during the reversing movement of the frame, said means comprising fingers interposed between the panels arranged in pairs and in longitudinal alignment with respect to the space between the panels, and means for moving the fingers out of longitudinal alignment to spread the panels, the last named means including levers and a cam for actuating the levers.

9. In a photographic copying machine, the combination with a camera body embodying a lens and a casing, of a reversible holder within the casing adapted to support a sheet of sensitized material in the focal plane of the lens and comprising a rotatable frame structure, means for reversing the same, paper receiving panels normally urged one toward the other supported within the frame structure, rockable heads carried by the frame structure having inwardly projecting fingers between the panels eccentrically disposed with relation to the axes of rotation of their heads, and means for partially rotating the heads to cause the fingers to spread the panels.

10. In a photographic copying machine, the combination with a camera body embodying a lens and casing, a sheet holding mechanism within the casing adapted to support the sensitized sheet of material in the focal plane of the lens, said mechanism comprising a frame, a pair of transparent panels in the frame normally urged one toward the other, means for reversing the frame, paper receiving panels normally urged one toward the other supported within the frame structure, rockable heads carried by the frame structure having inwardly projecting fingers between the panels eccentrically disposed with relation to the axes of rotation of their heads, and means for partially rotating the heads to cause the fingers to spread the panels, said means comprising arms on the heads, a link connecting the arms, an arm connected to one of the heads and a cam on which the last named arm may ride.

11. A photographic copying machine comprising, in combination, a camera body, means for holding a supply of sensitized sheet material, a support within said body for holding sheet material in position to be exposed, mechanism for opening said support to permit sheet material to be fed thereto, means for feeding a portion of said supply of sheet material to said support, mechanism for severing the portion fed to said support from the remaining portion of said sheet material, and means for closing said support to clamp the sheet material therein.

12. A photographic copying machine comprising, in combination, a camera body, means for holding a supply of sensitized sheet material in the form of a strip, a support within said body for holding sheet material in position to be exposed, said support comprising a pair of members movable away from each other to provide a sheet receiving space between them and movable toward each other to hold a sheet received in said space, means for feeding a portion of said supply of sheet material into the space between said pair of members when the members are away from each other, and mechanism between said support and said supply holding means for severing said sheet material.

13. A photographic copying machine comprising, in combination, a camera body, means for holding a supply of sensitized sheet material in the form of a strip, a support rotatably mounted within said camera body for holding sheet material in position to expose first one side and then the other side thereof, said support comprising a pair of members movable away from each other to provide a sheet receiving space between them and movable toward each other to hold a sheet received in said space, means for feeding a portion of said supply of sheet material into the space between said pair of members when the members are away from each other, and mechanism between said support and said supply holding means for severing said sheet material.

14. A photographic copying machine comprising, in combination, a camera body, means for holding a supply of sensitized sheet material in the form of a strip, a support rotatably mounted within said camera body for holding sheet material in position to be exposed, means for feeding a portion of said supply of sheet material to said support, mechanism for severing the portion of sheet material fed to said support from the remainder thereof, means for retaining the severed portion of sheet material in cooperative relation to said support, mechanism for rotating said support to present first one side of said severed portion of sheet material and then the other side thereof in position to be exposed, and means for releasing said severed portion of sheet material after exposure thereof so that it may be removed from said support.

In testimony whereof I affix my signature.

ARTHUR W. CAPS.